Nov. 18, 1947.  L. V. GROVER  2,431,116
DRY BATTERY CASING
Filed Jan. 13, 1944
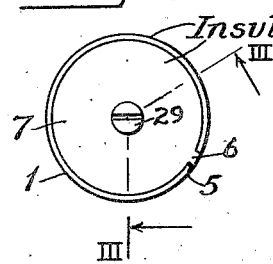
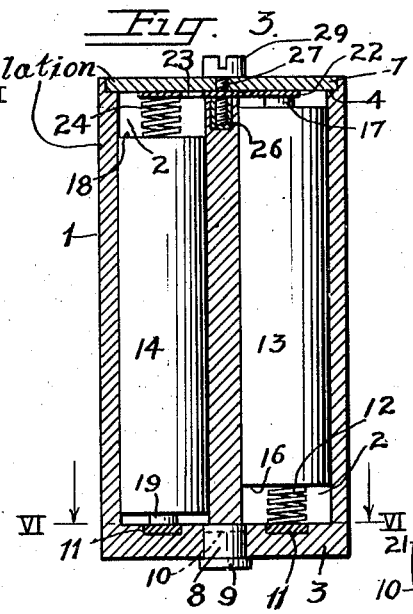
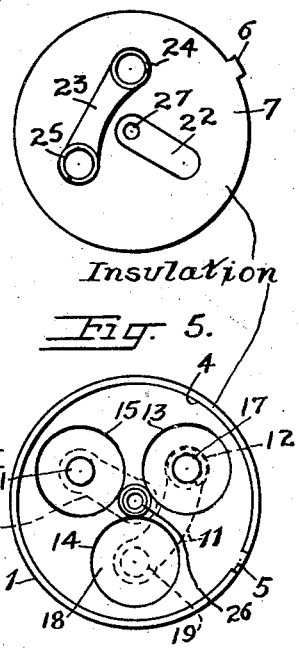
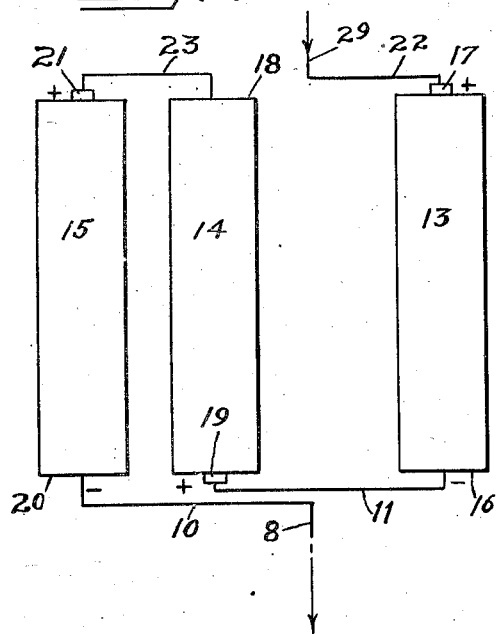
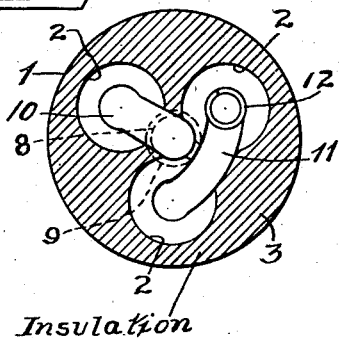
Inventor
Lyndon V. Grover.

Patented Nov. 18, 1947

2,431,116

UNITED STATES PATENT OFFICE 2,431,116

DRY BATTERY CASING

Lyndon V. Grover, Los Angeles, Calif.

Application January 13, 1944, Serial No. 518,093

5 Claims. (Cl. 136—173)

1

The present invention relates to an improved multiple cell miniature battery readily adaptable for use in connection with flash light synchronized photography and making it possible to take more of the guess out of synchronized photo taking. The miniature multiple celled battery of this invention is of course adaptable for many other purposes where it is desired to conserve space and at the same time obtain an increase in battery power without requiring a longer and more cumbersome battery case such as would be necessary if the number of single cell miniature batteries was increased to obtain a desired voltage. The present invention therefore has been made to provide an improved battery unit including a container of the size of the ordinary single miniature battery cell but constructed to receive a plurality of midget cells therein connected in series to produce a desired voltage.

It is an object of this invention to provide an improved and simplified form of battery which is designed with improvements for increasing the adaptability and efficiency thereof.

It is also an object of this invention to provide an improved and simplified form of dry cell battery unit readily adaptable for improving the efficiency of flash bulb synchronized photograph taking to make such work more positive by providing the required reserve in battery strength in a reduced space by the provision of a plurality of midget cells in a miniature battery case.

It is a further object of this invention to provide an improved battery unit consisting of an insulation container of substantially the same size as that of a single miniature battery cell but chambered for the reception of two or more midget or penlight cells for increasing the voltage of a battery unit to a desired amount.

It is furthermore a feature of this invention to provide an improved type of battery unit whereby the voltage may be increased to a desired amount without increasing the amperage by providing a unit in which an insulation container of the size of an ordinary miniature battery is provided with a plurality of parallel chambers for the reception of a plurality of midget or penlight battery cells with means for connecting the cells in series between a negative terminal molded in the bottom of the container and a positive terminal carried by a container lid or cover which is held in place by the positive terminal.

Other objects and features of the invention will more fully appear from the following description taken in connection with the accompanying drawings which illustrate a preferred embodiment of the invention.

In the drawing:

Figure 1 is a top plan view of a battery unit embodying the principles of this invention;

Figure 2 is a side elevation thereof;

Figure 3 is an enlarged, vertical sectional view taken on the line III—III of Figure 1 with parts shown in elevation;

Figure 4 is a bottom plan view of the battery casing cover removed from the casing;

Figure 5 is a top plan view of the battery unit with the cover removed;

Figure 6 is a transverse sectional view taken on line VI—VI of Figure 3 with the supporting spring for one of the cells in position; and Figure 7 is a schematic wiring diagram of the battery unit.

As shown in the drawing:

The improved battery of this invention is preferably of a miniature type and constructed to conserve space so that a required increase in voltage may be easily obtained and furthermore without necessitating increasing the battery space with each multiple increase of voltage desired above that of an ordinary standard miniature battery of one and one half volts.

In the present showing of the improved battery unit, a battery is provided which will only occupy the space of an ordinary standard miniature battery but which includes three midget cells within the standard size miniature casing to provide an increase in voltage from 1½ volts to 4½ volts.

The improved battery unit comprises a container or case constructed of plastic or any suitable non-conducting material. The battery container or case 1 is of substantially solid material which is formed or drilled to provide three parallel chambers or compartments 2 open at the top and closed at the bottom by an integral bottom or base plate 3 for the casing 1. The open top of the battery container or casing 1 is formed with a circular seat 4 and with a radially directed notch or keyway 5 adapted to receive a finger or key 6 which is integrally formed radially on the periphery of an insulation cover or top plate 7 when the same is engaged to seat in the seat 4 to close the battery container or casing 1. The provision of the key 6 and the keyway 5 permits the cover 7 to be engaged only in one predetermined position to close the battery case.

Molded axially in the casing base plate 3 is a contact stud 8 having an exposed head 9 which forms the main negative contact terminal for the battery unit. Integrally formed or rigidly secured to the inner end of the contact stud 8 is a contact arm 10 which is embedded in the inner face of the casing base plate 3 and which extends radially outwardly so that the outer end of the contact arm 10 projects radially into one of the cell compartments 2 as illustrated in Figure 6. Also embedded in the inner face of the casing base plate 3 is a connecting link or bar 11 which is arc shaped and has the ends thereof extending into the other two compartments 2. Secured upon one end of the connecting link 11 is a coiled spring 12.

Removably engaged in the three casing compartments 2 are three midget or penlight battery cells 13, 14 and 15, each of 1½ volts. The midget cell 13 is provided with a negative end 16 at one end and with a positive terminal 17 at the other end. The midget cell 14 is similarly formed with a negative end 18 at one end thereof and with a positive terminal 19 at the opposite end thereof. The third midget cell 15 is provided with a negative end 20 at one end and with a positive terminal 21 at the opposite end. The three midget cells 13, 14 and 15 are arranged in the battery case 1 within the compartments 2 with the midget cell 13 having the negative terminal 16 at the bottom to seat upon the upper end of the coiled spring 12. The midget cell 14 is reversed so that the positive terminal 19 thereof is disposed in the bottom of one of the compartments 2 to seat against the second end of the connecting link 11. The third midget cell 15 is engaged in its compartment 2 with the negative terminal 20 at the bottom to contact one end of the contact arm 10. The arrangement of the three midget cells within the casing 1 is such that the midget cells may be connected in series as illustrated in the schematic wiring diagram of Figure 7 when the top plate 7 is engaged in position as shown in Figure 3.

Secured radially on the inner face of the top plate 7 is a contact arm 22 which extends from the center of the top plate radially outwardly as shown in Figure 4. The outer end of the contact arm 22 is adapted to make contact with the positive terminal 17 of the midget cell 13. Also secured on the inner face of the top plate 7 is an arc shaped connecting link or bar 23 having contact coiled springs 24 and 25 contacting the ends thereof with the contact spring 24 secured to the bar 23 and adapted to seat against the negative terminal 18 of the midget cell 14 while the coiled spring 25 is secured to the positive terminal 21 of the midget cell 15 and is adapted to seat against the bar 23 when the top plate 7 is in place to close the top of the battery case 1.

Molded or rigidly secured in the center of the upper end of the casing 1 is an internally threaded bushing 26 which is adapted to have the opening therein communicate with an opening 27 in the contact arm 22 for the reception of the threaded shank 28 of a main positive battery terminal or contact 29. The main positive contact 29 serves a double purpose, namely that of being the main positive contact or terminal for the battery as well as a means for threading into the bushing 26 to hold the battery casing cover or top plate 7 secured in a predetermined position to close the top of the casing 1 with the key 6 seating in the casing keyway 5 to insure a positive connection of the midget cells 13, 14 and 15 in series with one another as illustrated in the wiring schematic of Figure 7 to produce an improved miniature cell of 4½ volts in a space one-third as large as that which would normally be required if three miniature batteries were used each being of the size of the batery case 1, and each having a voltage of 1½ volts.

The improved battery unit of this invention is therefore only of the size of an ordinary miniature battery cell but is adapted to provide an increased voltage depending upon the number of midget cells within the casing. The invention thus provides an improved battery which is readily adaptable for use in connection with flash light cameras having a synchronizing equipment connected thereto for the purpose of more successfully taking flash light photographs by adjusting the sychronizer equipment to cause the flash bulb to be first fired, and then at a proper time interval, to open the camera shutter so that the greatest shutter opening is obtained or synchronized to the greatest light output of the fired flash bulb.

While the improved battery unit is adaptable for use with flash bulb synchronized photograph cameras to increase the efficiency thereof it will of course be understood that the improved battery unit may also be adapted for other purposes wherein it is necessary to increase the battery voltage and at the same time reduce the space required for the reception of the batteries.

It will furthermore be understood that various details of construction may be varied through a wide range without departing from the principles of this invention and it is, therefore, not the purpose to limit the patent granted hereon otherwise than necessitated by the scope of the appended claims.

I claim as follows:

1. A battery unit comprising an insulation casing, having a plurality of compartments therein, an insulation bottom integrally formed at one end of said casing, an insulation cover seated in the upper end of the casing, a main positive terminal means on the cover axially engaging the casing for holding the cover in place, an upper contact arm secured on the inner side of the cover and connected with said main positive terminal means, an upper connecting link secured on the inner side of the cover, a pair of spaced springs seated thereagainst and disposed within the upper ends of two of said compartments, a main negative terminal means in the bottom and projecting axially therefrom, a lower contact arm secured to the inner end of said main negative terminal means and projecting into one of the casing compartments, a lower connecting link on the inner face of the casing bottom and projecting into two other casing compartments, a lower contact spring on one end of the lower connecting link and projecting upwardly into the compartment into which the upper contact arm projects, and a plurality of battery cells, one engaged in each of the compartments with two of said cells having the positive ends up and one having the negative end up, said cells connected in series with the main battery terminal means through the upper and lower contact arms, springs and links.

2. A battery unit comprising an insulation casing including an integral bottom and a removable top, said casing having a plurality of battery cells compartments therein, battery cells in said compartments and arranged in reversed relationship with respect to one another, connecting means carried by the casing bottom and top and connecting the battery cells in series, and main terminals axially disposed in the casing top and bottom connected in series with said connecting means and with said battery cells.

3. A battery unit comprising an insulation case having a plurality of compartments therein, a bottom integrally formed on the case, a negative main terminal axially projecting from the bottom, connecting members on the bottom connected with the negative main terminal and projecting into said compartments, a cover for the case, a positive main terminal axially projecting from said cover and secured to the case to hold the cover in place, connecting members on said cover connected with the positive main terminal and projecting into said compartments, battery cells in said compartments, and spring members in said case between the battery cells and said connecting members to serve as connectors and also act to hold the battery cells resiliently in place within the compartments, said battery cells being connected in series with said main terminals by said connecting members and said spring members.

4. In a battery unit of the class described, a battery cell container comprising an insulation casing having three battery cell compartments, a bottom integrally formed on one end of the casing, a terminal member molded in said bottom and projecting axially therefrom, a connecting bar on said bottom connected to said terminal member and projecting into one of said compartments, a connecting link on said bottom and connecting two other of said compartments, a spring on said link, a removable cover for the opposite end of the casing, a terminal member projecting axially through said cover and into said casing to hold the cover in place, a connecting bar in said cover connected to said cover terminal member and projecting into one of said compartments, a connecting link on the cover projecting into two of the compartments, and springs on said cover mounted connecting link and projecting into said two compartments.

5. In a battery unit of the class described, a battery cell container comprising a solid insulation casing having a plurality of parallel battery cell compartments therein opening through the top only of said casing and closed at the opposite ends by an integral bottom forming part of the casing, a terminal member axially disposed in said bottom and projecting out of the casing, battery cell connector means on said bottom and connected with the battery cell compartments, a cover for closing the open ends of said compartments, a terminal member projecting axially through the cover and also serving to retain the cover on the casing, and battery cell connector means carried by the cover and connected with the battery cell compartments.

LYNDON V. GROVER.

REFERENCES CITED

The following references are of record in the file of this patent:

UNITED STATES PATENTS

| Number | Name | Date |
| --- | --- | --- |
| 2,137,230 | Arden | Nov. 22, 1938 |
| 1,224,376 | Hambuechen | May 1, 1917 |
| 573,493 | Stephenson | Dec. 22, 1896 |
| 816,384 | Schneider | Mar. 27, 1906 |
| 1,146,806 | Manson | July 20, 1915 |
| 2,035,995 | Sturges | Mar. 31, 1936 |
| 2,036,547 | Siemon | Apr. 7, 1936 |
| 2,058,755 | Arnesen | Oct. 27, 1936 |